Sept. 9, 1941.   T. J. SMULSKI   2,255,474
WINDSHIELD WIPER ARM
Filed July 26, 1939

INVENTOR
Theodore J. Smulski
BY Alois W. Graf
ATTORNEY

Patented Sept. 9, 1941

2,255,474

UNITED STATES PATENT OFFICE 2,255,474

WINDSHIELD WIPER ARM

Theodore J. Smulski, Knox, Ind., assignor to Productive Inventions, Inc., Gary, Ind.

Application July 26, 1939, Serial No. 286,495

7 Claims. (Cl. 15—255)

My invention relates to windshield wipers and more particularly to windshield wiper arms provided with means for varying the biasing force or spring tension which causes the arm to bear against the windshield wiper blade.

In order to obtain the proper operation of a windshield wiper blade or squeegee it is necessary to have the proper degree of tension or biasing force on the windshield wiper arm so as to apply the proper pressure to the blade. It has been found that upon new automobiles it is frequently desirable to demonstrate the operation of the windshield wiper, but this is not always possible since a new windshield wiper blade has a greater coefficient of friction on the windshield than a used blade, and furthermore the normal operation of a windshield wiper blade is upon a wet windshield. Certain windshield wiper actuating mechanisms are so designed as to have just sufficient power for the normal operating conditions of a windshield wiper, that is during a rain, and hence these mechanisms cannot operate on a dry windshield when the tension of the arm is such as to be adequate for normal operation. Furthermore, it has been found that where electric windshield wiper actuating mechanisms are utilized, these mechanisms are provided with a safety clutch or device which disengages the arm whenever the friction on the blade exceeds a predetermined amount. This safety feature frequently operates when an attempt is made to demonstrate the operation of the windshield wiper upon a dry windshield. It is also an object of my invention to provide a windshield wiper arm which may be adjusted so as to permit for the purposes of demonstration the operation of the windshield wiper upon a dry windshield.

In accordance with my invention in its broader aspects the windshield wiper arm is constructed of a plurality of sections pivotally connected together and a plurality of biasing means are provided for urging the windshield wiper arm in a direction toward the windshield and further means are provided for rendering inoperative one or more of the biasing means.

For a better understanding of my invention, together with other and further objects thereof, references as to the following description taken in connection with the accompanying drawing, and its scope will be pointed out in the appended claims.

Fig. 1 of the drawing illustrates my invention in relation to the windshield wiper actuating mechanism, the windshield wiper blade and the windshield;

Figure 1:
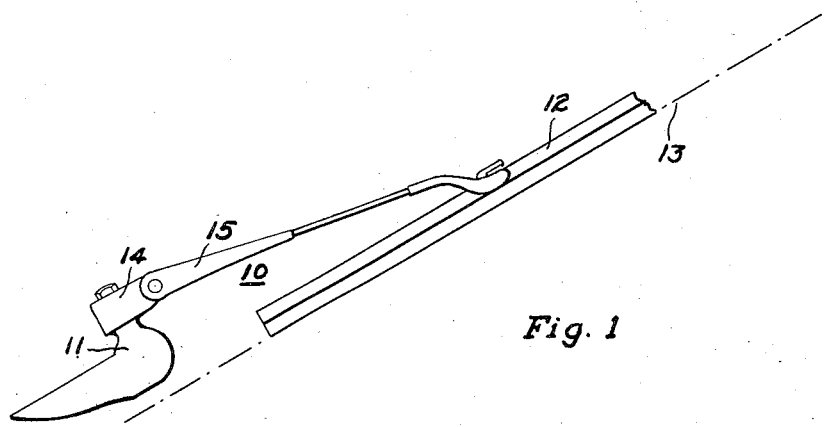

Referring more particularly to Fig. 1 of the drawing, there is illustrated an arrangement embodying my invention wherein the windshield wiper arm 10 is connected to the operating shaft of an actuating mechanism 11, and a free end of the arm 10 is connected to a windshield wiper blade 12 which is in engagement with the surface of a windshield, which surface is indicated by the dotted line 13. From this figure it will be apparent that the arm 10 comprises a plurality of sections, an inner section 14 which is rigidly secured to the operating mechanism of the windshield 11, and an outer section 15 which is pivotally connected to the inner section 14 so as to move in a plane substantially perpendicular to the plane of the windshield 13.

Figure 2:
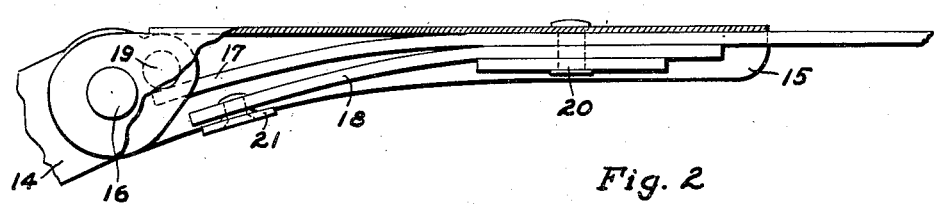
Fig. 2 is a part sectional side view of my invention where a portion of the biasing means have been rendered inoperative.
Figure 3:
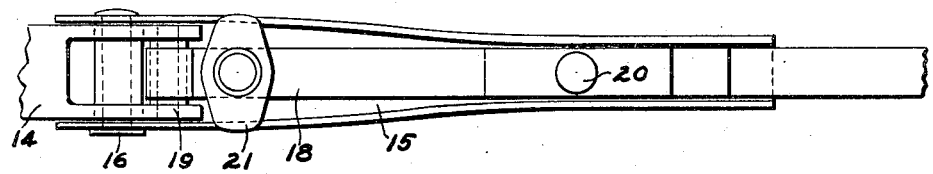
Fig. 3 is a bottom view of the arm showing a portion of the biasing means rendered in operative.
Figure 4:
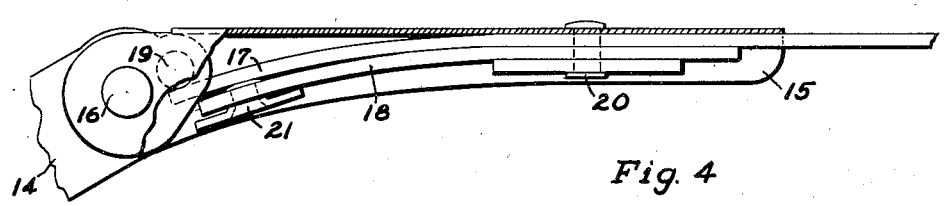
Fig. 4 is a part sectional side view of the arm showing all of the biasing means in operation.
Figure 5:
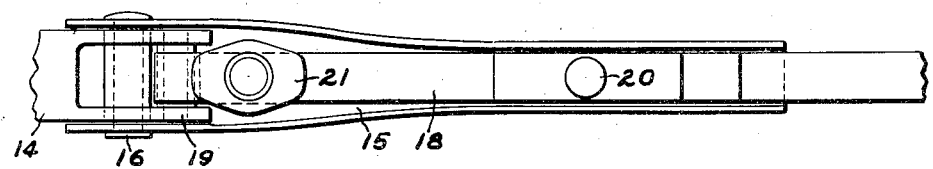
Fig. 5 is a bottom view of the arm under the same condition as Fig. 4.

By referring to Fig. 2 it will be seen that the outer section 15 is pivotally connected to the inner section 14 by a suitable fastening means 16. The outer section 15 is provided with a plurality of spring biasing means such as leaf spring 17 and 18 which are arranged to engage a contact element 19 thereby biasing the outer arm in a direction toward the surface of the windshield. Spring leaf biasing means 17 and 18 are connected to the outer section 15 by a rivet or other suitable fastening means. While for the purposes of illustration I have shown spring biasing means 17 and 18 each comprising a single flat spring member, it will be apparent to those skilled in the art that each of these members may comprise a plurality of flat springs and that furthermore in place of such flat springs other types of springs or biasing means may be employed. In Figs. 2 and 3 a portion of the biasing means such as spring 18 has been rendered ineffective by means of a disengaging means in the form of a turn button 21. The turn button 21 which is fastened to one extremity of the spring leaf member 18, when in the position shown in Fig. 3, engages the outer edges of the side members of the channel portions of the outer arm 15. In this position the spring member 18 does not cooperate with the spring member 17 so that only a portion of the maximum biasing portion is effective to urge the arm in a direction toward the windshield. When the arm is in the operating condition shown in Figs. 2 and 3 the windshield wiper mechanism will have sufficient power to operate the windshield wiper blade across the surface of the windshield even if this blade is so new as to have a relatively high coefficient of friction on dry glass. The turn button 21 is of such shape that when it is rotated through an angle of 90° the spring biasing member 18 will engage the spring member 17 thereby cooperating to apply a greater biasing force against the contact member 19 thereby exerting greater force upon the outer free end of the wiper arm 10 which engages the windshield wiper blade 12. When the windshield wiper arm is in the operating condition shown in Figs. 4 and 5 the proper degree of biasing force is applied to the wiper blade to produce a proper squeegee and wiping action of the blade under normal operating conditions such as when the windshield is moistened with rain or other precipitation. When the automobile is to be delivered to the ultimate consumer, windshield wiper arms are adjusted so as to be in the operating conditions shown in Figs. 4 and 5. In order to change the operating condition of the arm from the condition shown in Figs. 4 and 5 to that of Figs. 2 and 3 or vice versa it is only necessary to raise the arm in a direction substantially perpendicular to the windshield thus causing the contact member of 19 to sufficiently bend or flex the biasing member 17 and 18 so that the turn button may be readily operated to either of its operating positions. When the button has thus been operated the arm is released and its new operating condition is assumed.

While this invention has been shown and described in connection with certain specific embodiments, it will, of course, be understood that it is not to be limited thereto, since it is apparent that the principles herein disclosed are susceptible of numerous embodiments, and that modifications may be made in the instrumentalities employed without departing from the spirit and scope of the invention as set forth in the appended claims.

What I claim as new and desire to secure by Letters Patent of the United States is:

1. A windshield wiper arm adapted to cooperate with a windshield wiper actuating mechanism operatively related to a windshield, and comprising multiple sections including an inner section having at one end thereof means for engaging said windshield wiper actuating mechanism, a second section having a channel shaped portion pivotally connected to the free end of said first section, leaf spring means mounted within said channel portion for biasing said second section toward said windshield, and a turn button mounted on a portion of said means for cooperation with said channel portion and for rendering ineffective at least one of said leaf spring biasing means.

2. A windshield wiper arm adapted to cooperate with a windshield wiper actuating mechanism operatively related to a windshield, and comprising multiple sections including an inner section having at one end thereof means for engaging said actuating mechanism and having at the other end thereof a transverse pivotal connection, a second section having a channel shaped portion connected to said first section at said pivotal connection, leaf spring means mounted within said channel portion and cooperating with both said sections for yieldingly urging said second section toward said windshield, and a turn button mounted on a portion of said means for cooperation with said channel portion and for rendering ineffective a portion of said latter means.

3. A windshield wiper arm adapted to cooperate with a windshield wiper actuating mechanism operatively related to a windshield, and comprising multiple sections including an inner section having at one end thereof means for connecting said section to said actuating mechanism, a second section having a channel shaped portion pivotally connected to the free end of first said section, a plurality of leaf spring means mounted within said channel shaped portion for biasing said second section toward said windshield, and means cooperating with said channel shaped portion for rendering ineffective only one of said spring means.

4. A windshield wiper arm adapted to cooperate with an actuating member operatively related to a windshield, and comprising an inner section adapted to be rigidly connected to said actuating member, an outer section pivotally mounted on said inner section for movement in a plane substantially perpendicular to said windshield, said outer section having a channel shaped portion adjacent said pivot and a plurality of flat spring means mounted on and secured within the channel portion of said second section and extending from its securing means into engagement with said first section for urging said second section toward said windshield, and means for rendering ineffective a portion of said spring means by suspending the free end thereof from the sides of said channel portion.

5. A windshield wiper arm adapted to cooperate with a wiper actuating mechanism operatively related to a windshield and comprising an inner section and an outer section, said inner section being provided at one end thereof with means for securing said arm to said actuating mechanism, means pivotally connecting said outer section to said inner section for movement in a plane substantially perpendicular to the windshield, said outer section adjacent the pivotal connection thereof comprising a channel shaped portion, a plurality of spring means for biasing said outer section toward the windshield being located within said channel portion, and means for selectively rendering inoperative at least one of said spring means thereby to reduce the biasing force, said means comprising a turn button secured to said spring means and adapted in one position to extend across said channel portion.

6. A windshield wiper arm adapted to cooperate with a wiper actuating mechanism operatively related to a windshield and comprising an inner section and an outer section, said inner section being provided at one end thereof with means for securing said arm to said actuating mechanism and having adjacent the free end thereof a contact element, means pivotally connecting said outer section to said inner section for movement in a plane substantially perpendicular to the windshield, said outer section being provided with a channel portion having mounted therein a leaf spring member having one end thereof in engagement with said contact element thereby to bias said outer section toward said windshield, and at least one other leaf spring member arranged to augment the biasing effect of said first spring member, and means cooperating with said channel shaped portion for rendering ineffective said other leaf spring member only.

7. A windshield wiper arm adapted to cooperate with a wiper actuating mechanism operatively related to a windshield and comprising an inner section and an outer section, said inner section being provided at one end thereof with means for securing said arm to said actuating mechanism, and having adjacent the free end thereof a contact element, means pivotally connecting said outer section to said inner section for movement in a plane substantially perpendicular to the windshield, said outer section having a channel shaped portion adjacent said pivot connection, a leaf spring member mounted on the base of said outer section channel portion and having the free end thereof in engagement with said contact element thereby to bias said outer section toward said windshield, and at least one other leaf spring member mounted on said outer section channel portion and arranged to augment the biasing effect of said first spring member, and manually operable means for rendering ineffective said other leaf spring member by suspending the free end thereof from the sides of said channel portion.

THEODORE J. SMULSKI.